Patented Apr. 9, 1946

2,398,157

UNITED STATES PATENT OFFICE 2,398,157

PROCESS FOR PRODUCING ETHYLENE GLYCOL AND ETHYL ACETATE

Alexander S. Ramage, Detroit, Mich., assignor to Albert A. F. Maxwell, Detroit, Mich., as trustee No Drawing. Application September 16, 1944, Serial No. 554,556

3 Claims. (Cl. 260—493)

This invention relates to a process for producing ethylene glycol and ethyl acetate.

It is the object of this process to produce ethylene glycol from ethylene dichloride with a valuable by-product. This is done by reacting the dichloride under pressure with basic lead acetate dissolved in alcohol in slight excess. There are several basic lead acetates but I prefer

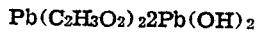

$Pb(C_2H_3O_2)_2 \cdot 2Pb(OH)_2$ since it is very soluble in alcohol.

By way of illustration, 807 pounds of this basic acetate is dissolved in 21 gallons of ethyl alcohol and 28.6 gallons of ethylene dichloride is added. This mass is placed in an autoclave and heated to 200 to 500 pounds per square inch pressure with constant agitation. It is thereafter allowed to cool and then filtered in a closed filter to prevent loss by evaporation and the lead chloride washed with alcohol. The solution from the filter contains the ethylene glycol and ethyl acetate together with the excess of alcohol. The reaction is as follows:

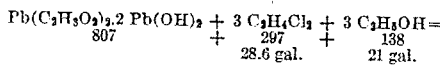

$$Pb(C_2H_3O_2)_2 \cdot 2Pb(OH)_2 + 3 C_2H_4Cl_2 + 3 C_2H_5OH =$$
$$807 \qquad\qquad\qquad\quad 297 \qquad\quad 138$$
$$\qquad\qquad\qquad\qquad 28.6 \text{ gal.} \qquad 21 \text{ gal.}$$

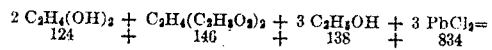

$$2 C_2H_4(OH)_2 + C_2H_4(C_2H_3O_2)_2 + 3 C_2H_5OH + 3 PbCl_2 =$$
$$124 \qquad\qquad 146 \qquad\qquad 138 \qquad\quad 834$$

with further reaction as follows:

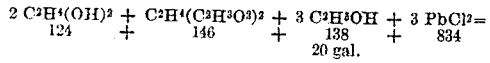

$$2 C_2H_4(OH)_2 + C_2H_4(C_2H_3O_2)_2 + 3 C_2H_5OH + 3 PbCl_2 =$$
$$124 \qquad\qquad 146 \qquad\qquad 138 \qquad\quad 834$$
$$\qquad\qquad\qquad\qquad 20 \text{ gal.}$$

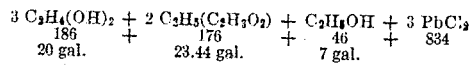

$$3 C_2H_4(OH)_2 + 2 C_2H_5(C_2H_3O_2) + C_2H_5OH + 3 PbCl_2$$
$$186 \qquad\qquad 176 \qquad\qquad 46 \qquad\quad 834$$
$$20 \text{ gal.} \qquad\quad 23.44 \text{ gal.} \qquad 7 \text{ gal.}$$

The lead chloride is treated with caustic soda using the mass reaction as in my United States patent on lead sulfate No. 787,541, April 18, 1905. This reaction is as follows:

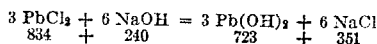

$$3 PbCl_2 + 6 NaOH = 3 Pb(OH)_2 + 6 NaCl$$
$$834 \quad\;\; 240 \qquad\quad 723 \qquad\;\; 351$$

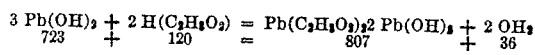

$$3 Pb(OH)_2 + 2 H(C_2H_3O_2) = Pb(C_2H_3O_2)_2 \cdot 2Pb(OH)_2 + 2 OH_2$$
$$723 \qquad\quad 120 \qquad\qquad 807 \qquad\qquad\qquad 36$$

The filtrate is then distilled, the ethyl alcohol and ethyl acetate coming over together leaving the ethylene glycol. The mixture of alcohol and ethyl acetate is shaken up with a little water which dissolves out the alcohol and about 7% of the acetate. The water solution is therefore used over with the next batch of ethyl alcohol and acetate to save the loss of acetate. Using 807 pounds basic lead acetate, 28.6 gallons of ethylene dichloride, 21 gallons of ethyl alcohol, 120 pounds acetic acid (to reform the basic acetate) and 240 pounds of caustic soda, there should be obtained 20 gallons (186 pounds) of ethylene glycol and 23.44 gallons (176 pounds) of ethyl acetate and 7 gallons (46 pounds) excess alcohol for reuse.

I do not intend to limit myself to the use of basic acetate of lead but other diacetates can be used which form chlorides insoluble in alcohol.

I claim:

1. A process for producing ethylene glycol and ethyl acetate, comprising reacting basic lead acetate in the presence of ethyl alcohol with ethylene dichloride.

2. A process for producing ethylene glycol and ethyl acetate, comprising reacting basic lead acetate, ethyl alcohol and ethylene dichloride while heating the same in a closed container to a pressure falling within a range of from 200 to 500 pounds per square inch whereby ethylene glycol, ethyl acetate, ethyl alcohol and lead chloride are formed.

3. A process for producing ethylene glycol and ethyl acetate, comprising reacting basic lead acetate, ethyl alcohol and ethylene dichloride, said compounds being reacted in the proportion of about 807 pounds basic lead acetate, about 138 pounds of ethylene alcohol and about 297 pounds of ethylene dichloride while heating the same under pressure whereby ethylene glycol, ethyl acetate, ethyl alcohol and lead chloride are formed.

ALEXANDER S. RAMAGE.